United States Patent
Shamblin et al.

(10) Patent No.: US 6,379,075 B1
(45) Date of Patent: Apr. 30, 2002

(54) QUICK COUPLER APPARATUS

(75) Inventors: Wayne A. Shamblin, Burleson; Edward A. Johnson, Fort Worth; Richard L. Campbell, Cedar Hill, all of TX (US)

(73) Assignee: GH Hensley Industries, Inc., Dallas, TX (US)

( * ) Notice: Subject to any disclaimer, the term of this patent is extended or adjusted under 35 U.S.C. 154(b) by 0 days.

(21) Appl. No.: 09/484,341

(22) Filed: Jan. 18, 2000

(51) Int. Cl.[7] .............................. E02F 3/36; B25G 3/18
(52) U.S. Cl. ................... 403/322.1; 403/315; 414/723; 37/468
(58) Field of Search ................................ 414/723, 724; 403/322.1, 322.3, 325, 331; 37/468

(56) References Cited

U.S. PATENT DOCUMENTS

| | | | | |
|---|---|---|---|---|
| 2,963,183 A | * | 12/1960 | Przybylski | 414/723 |
| 3,964,622 A | * | 6/1976 | Blair et al. | 414/723 |
| 3,985,249 A | * | 10/1976 | Aker et al. | 214/145 |
| 4,203,238 A | * | 5/1980 | Bangert et al. | 414/723 X |
| 4,355,945 A | | 10/1982 | Pilch | 414/686 |
| 4,436,477 A | | 3/1984 | Lenertz et al. | 414/723 |
| 4,846,624 A | * | 7/1989 | Hohn | 414/723 |
| 4,881,867 A | * | 11/1989 | Essex et al. | 414/723 |
| 5,082,389 A | | 1/1992 | Balemi | 403/322 |
| 5,179,794 A | | 1/1993 | Ballinger | 37/117.5 |
| 5,332,353 A | | 7/1994 | Arnold | 414/723 |
| 5,382,110 A | | 1/1995 | Perotto et al. | 403/322 |
| 5,456,030 A | | 10/1995 | Barone et al. | 37/468 |
| 5,549,440 A | | 8/1996 | Cholakon et al. | 414/723 |
| 5,597,283 A | * | 1/1997 | Jones | 414/723 |
| 5,890,871 A | * | 4/1999 | Woerman | 414/723 |
| 6,132,130 A | * | 10/2000 | McCann | 403/322 |
| 6,132,131 A | * | 10/2000 | Nakamura et al. | 403/322.1 |
| 6,233,852 B1 | * | 5/2001 | Pemberton | 414/723 X |

FOREIGN PATENT DOCUMENTS

EP 272593 A * 6/1988 ................. 414/723

* cited by examiner

Primary Examiner—Lynne H. Browne
Assistant Examiner—Ernesto Garcia
(74) Attorney, Agent, or Firm—Konneker & Smith, P.C.

(57) ABSTRACT

A specially designed quick coupler is representatively used to removably attach an excavation bucket to the outer boom end of an excavator. A top portion of the quick coupler is pinned to the outer boom end and has a bottom portion with spaced apart recesses configured to releasably receive portions of stick and curl pins on the bucket. An arcuate latch hook is translationally drivable by a hydraulic cylinder assembly toward one of the implement pins to releasably lock it in its associated coupler recess in a manner also captively retaining the other implement pin in its associated coupler recess. Stop structures oppose the latch hook and, using a simple shim arrangement, may be translationally shifted toward and away therefrom to easily adjust the coupler for wear and/or changes in the implement pin spacing. A redundant safety system is incorporated in the coupler and serves to hold the latch hook in its locking position. The safety system includes hydraulic and mechanical locking mechanisms and a spring structure resiliently biasing the latch hook toward its locking position.

12 Claims, 5 Drawing Sheets

QUICK COUPLER APPARATUS

BACKGROUND OF THE INVENTION

The present invention generally relates to earthworking equipment and, in a preferred embodiment thereof, more particularly relates to quick coupler apparatus for releasably attaching excavator buckets and other implements to heavy construction equipment such as a hydraulic excavator.

In the excavation and earthworking industry various types of quick coupler devices have previously been utilized to provide for rapid connection and removal of various work implements, such as buckets, blades, claws and the like, to the articulated boom portion of a prime mover such as, for example, a hydraulic excavator. Typically, a quick coupler has a body portion with top side stick and curl pins to which lift and curl arm outer end portions of the boom are connected, and bottom side portion recesses which removably receive stick and curl pin portions of the implement to be connected to the boom via the quick coupler. A locking mechanism is incorporated in the quick coupler and is operative to releasably hold the implement stick and curl pins within the quick coupler recesses.

As the name implies, the primary advantage of the typical quick coupler is the speed with which it permits a selected implement to be connected to the prime mover boom. Before the advent of quick coupler devices of this sort, a selected work implement had to be connected directly to the outer boom end by driving the boom stick and curl pins through aligned holes in the implement and boom linkage portions. subsequent removal of the implement from the boom required that the stick and curl pins be driven out of the implement and boom linkage portions.

Although the now common use of this type of coupler device to interchangeably connect various work implements to prime mover booms by simply latching bottom side portions of the coupler to the stick and curl pin portions of the implement has markedly simplified and quickened the implement attachment process, conventional quick couplers of this general type carry with them various types of well known problems, limitations and disadvantages.

For example, as a conventional quick coupler and the implement pins to which it is removably attached begin to wear, the overall coupler/implement pin interface begins to loosen, thereby tending to cause undesirable "chatter" between the coupler and the implement. While some previously utilized couplers have a limited amount of adjustment to compensate for wear and differences in implement pin-to-pin centerline spacing, it is often difficult to achieve tight coupler-to-implement pin contact when such centerline distance drifts outside of a predetermined, rather limited range, to prevent this chatter Additionally, it is quite important to assure that the heavy equipment implement does not come loose from the quick coupler unless and until the equipment operator intends it to do so. Despite the importance of this design aspect from a safety standpoint, various conventional quick coupler designs have proven to be less than optimal from this design standpoint.

Another problem often associated with quick couplers of conventional design is that with respect to at least one of the implement pins to which the coupler is releasably latched the contact area between the coupler and the pin is relatively small. This concentrates the typically quite high coupler load on such pin along a relatively small area of the pin. In turn, this concentrated load on a relatively small area of the pin hastens pin wear and more quickly loosens the fit between the coupler and the implement pins to which it releasably attaches.

As can be readily seen from the foregoing, a need exists for a quick coupler which eliminates or at least substantially reduces the above-mentioned problems, limitations and disadvantages typically associated with quick couplers of conventional construction. It is to this need that the present invention is directed.

SUMMARY OF THE INVENTION

In carrying out principles of the present invention, in accordance with a preferred embodiment thereof, a specially designed quick coupler apparatus is provided for releasably attaching a work implement having spaced apart first and second attachment pins, representatively an excavation bucket, to a boom of a prime mover such as the vehicular portion of an excavator.

The quick coupler apparatus representatively comprises a body portion releasably securable to the boom and having spaced apart first and second recess areas operative to respectively and releasably receive the first and second work implement attachment pins. A latch member is carried by the body portion for movement relative thereto between (1) a locking position in which the latch member engages a first side portion of the received first attachment pin in a manner captively retaining the received first and second attachment pins respectively in the first and second recess areas, and (2) an unlocking position in which the latch member is disengaged from the first attachment pin and permits removal of the first and second attachment pins respectively from the first and second recess areas.

Preferably, the latch member has a generally hook-shaped configuration and is translatable between its locking and unlocking positions. In its locking position the latch member complementarily engages the received first attachment pin around a generally semicircular circumferential portion thereof. A drive structure, illustratively a pilot pressure-operable hydraulic cylinder assembly, is provided and is operative to selectively translate the latch member between its locking and unlocking positions.

In a preferred embodiment thereof the quick coupler apparatus has incorporated therein a redundant safety system that serves to prevent unintentional unlocking of the latch member. The redundant safety system illustratively includes (1) a check valve portion of the hydraulic cylinder assembly operative, in response to a loss of hydraulic pressure to the valve when the latch member is in its locking position, to hydraulically lock the latch member in its locking position, (2) a spring structure resiliently biasing the latch member toward its locking position, and (3) a blocking member extendable through aligned openings in the quick coupler body portion, when the latch member is in its locking position, and operative to mechanically block the latch member against movement from its locking position to its unlocking position.

As an additional safety feature, the spring structure is carried on an elongated guide rod which, when the latch member is translated to its unlocking position, longitudinally extends outwardly through an opening in an exterior wall of the body portion to give the equipment operator or other observer a visual indication that the latch member is in its unlocking position.

According to another aspect of the invention, a stop structure is provided and is operative to engage the received first attachment pin on a second side portion thereof, preferably opposite from the first side portion of the pin engageable by the latch member. The stop structure, in its preferred embodiment includes a stop member which is adjustably translatable toward and away from the latch member to thereby contact the received first attachment pin and dimensionally compensate for different implement pin-to-pin spacings and/or wear at the coupler/implement interface area.

The stop member preferably has an arcuate surface area complementarily engageable with a side portion of the received first attachment pin, and is secured to the body portion for translational movement toward and away from a surface thereof. The stop structure, in its preferred embodiment, further includes a selectively variable number of shim members releasably supported between the stop member and the surface of the body portion. By simply varying the number of shims interposed between the stop member and the body portion surface, the distance between the stop member and the second recess area can be easily and selectively varied.

DETAILED DESCRIPTION

Figure 1:
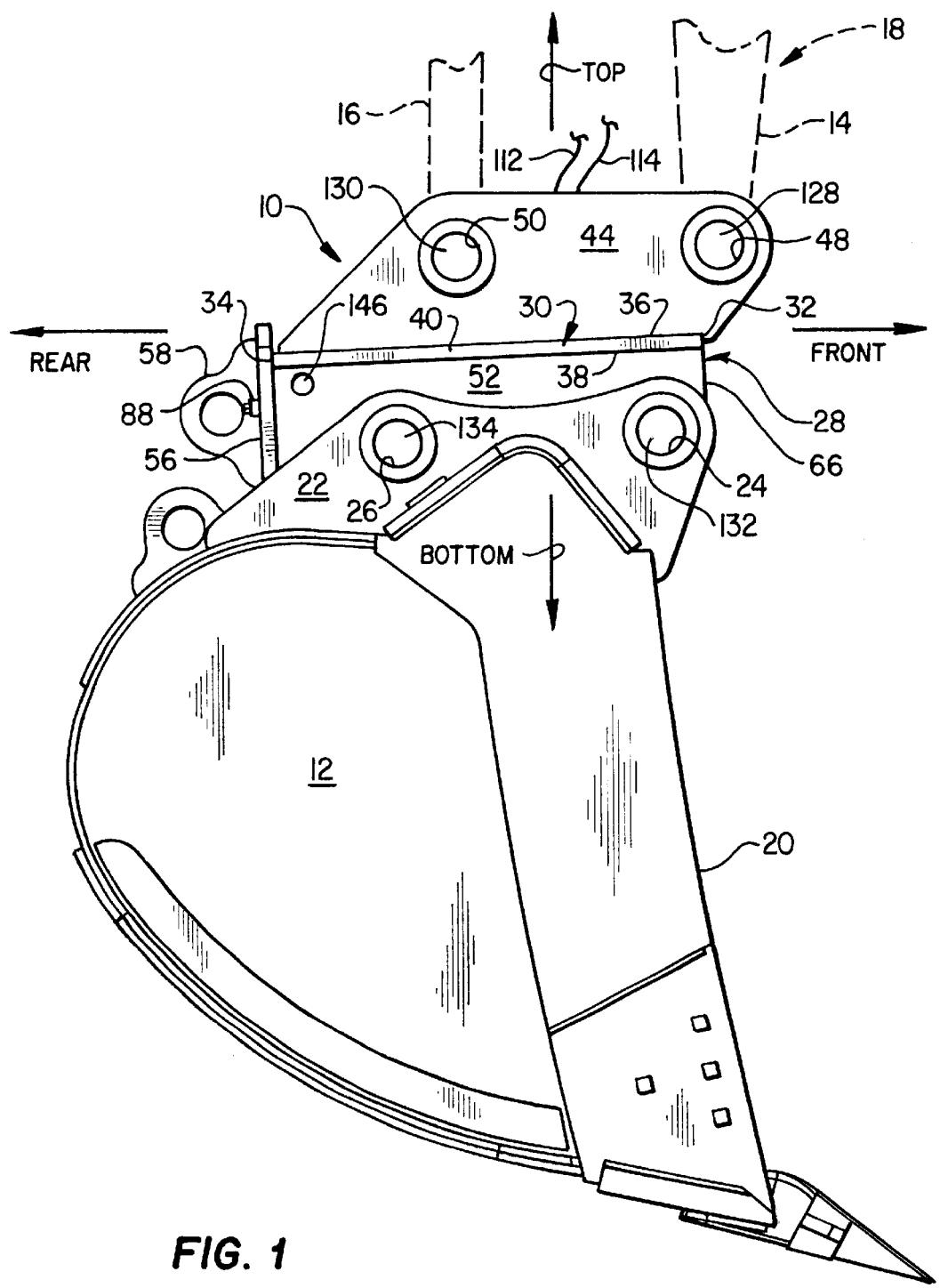
FIG. 1 is a side elevational view of a quick coupler device embodying principles of the present invention and being used to operatively connect an excavating bucket to an outer end portion of an excavator boom illustrated in phantom.

Referring initially to FIG. 1, the present invention provides a specially designed quick coupler 10 which is used to provide for the rapid and removable connection of a work implement, such as the illustrated excavation bucket 12, to outer lift and curl end portions 14,16 of the articulated hydraulic boom section 18 of a prime mover such as a wheeled excavator (not shown). Bucket 12 has an open front side 20, and a spaced apart pair of upwardly projecting top side plates 22 (only one of which is visible) in which facing pairs of front and rear reinforced circular holes 24,26 are formed.

As shown in FIGS. 2–5, the quick coupler 10 is of a heavy duty welded metal construction and has a coupler body 28 that includes a rectangular base plate 30 with front and rear ends 32 and 34. top and bottom sides 36 and 38, and left and right side edges 40 and 42. A spaced pair of parallel, laterally facing boom attachment side plates 44 and 46 project upwardly from left and right top side edge portions of the base plate 30 and have facing front and rear pairs of reinforced circular holes 48 and 50 formed therein.

The bottom side 38 of the base plate 30 has a spaced pair of parallel, laterally facing implement attachment side plates 52 and 54 depending therefrom and extending parallel to the top side plates 44 and 46. A rear end plate 56 is welded to the rear ends of the bottom side plates 52,54 and has a lifting eye 58 projecting rearwardly therefrom. For purposes later described herein, the rear end plate 56 has a pair of horizontally spaced circular holes 60 extending rearwardly therethrough.

Somewhat forwardly of the end plate 56 a pair of generally rectangular recesses 62 are formed in the bottom side edges of the bottom plates 52 and 54. Additionally, rearwardly extending recesses 64 are formed in the front end edges 66 of the bottom side plates 52,54 and have semicircular inner end edge portions 68. An elongated cross member 70 longitudinally extends between front end portions of the bottom side plates 52,54 and has a C-shaped cross section, a forwardly facing open side, and a semicircular inner side surface 72 which is aligned with the inner edge portions 68 of the front end recesses 64.

Still referring to FIGS. 2–5, the quick coupler 10 also includes a rectangular support plate 74 which has left and right side edge portions slidably received between vertically opposed pairs of support rails 76 welded to the inner sides of the bottom plates 52,54 adjacent the rear end plate 56. This positions the support plate 74 beneath the underside of the base plate 30 for sliding movement relative thereto transversely toward and away from the rear end plate 56.

A latch hook member 78 is welded to the underside of the support plate 74, for forward and rearward movement therewith relative to the coupler body 28, and has a hook portion 80 having a semicircular recess 82 formed in a front side thereof. At the front side of the latch hook member 78 is an attachment plate portion 84 which is downwardly offset from the support plate 74. A pair of spring stop blocks 86 are welded to the underside of the support plate 74 on opposite sides of the latch hook member 78, with elongated tubular spring guide members 88 longitudinally extending rearwardly from the stop blocks 86. The spring guide members 88 are aligned with the circular openings 60 extending through the rear end plate 56. Threaded closure members 90 are threaded into the rear ends of the spring guide members 88.

Figure 4:
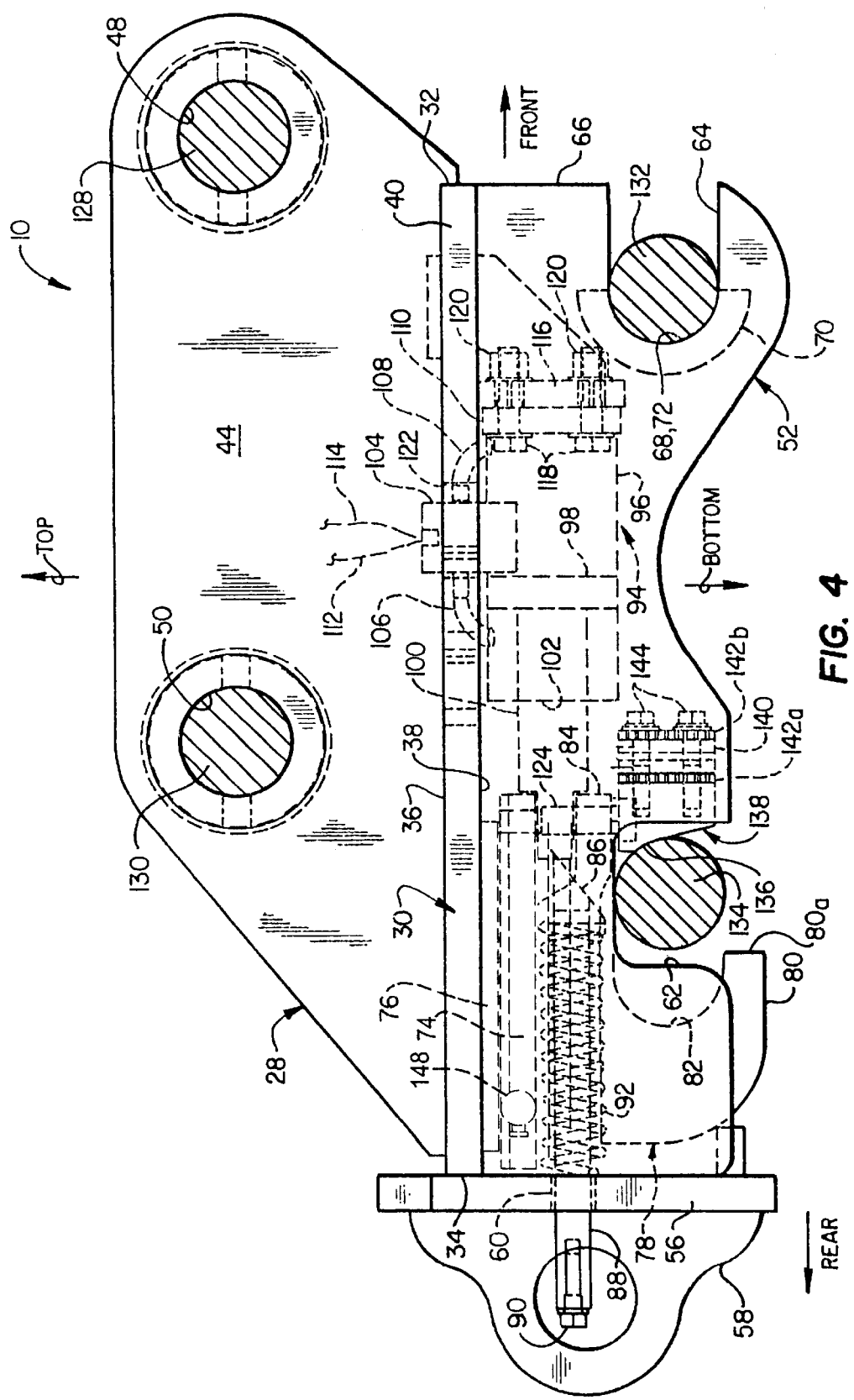
FIGS. 4 and 5 are enlarged scale side elevational views of the quick coupler device sequentially illustrating the manner in which it is releasably attached to spaced apart top side stick and curl pin portions of the excavating bucket.
Figure 5:
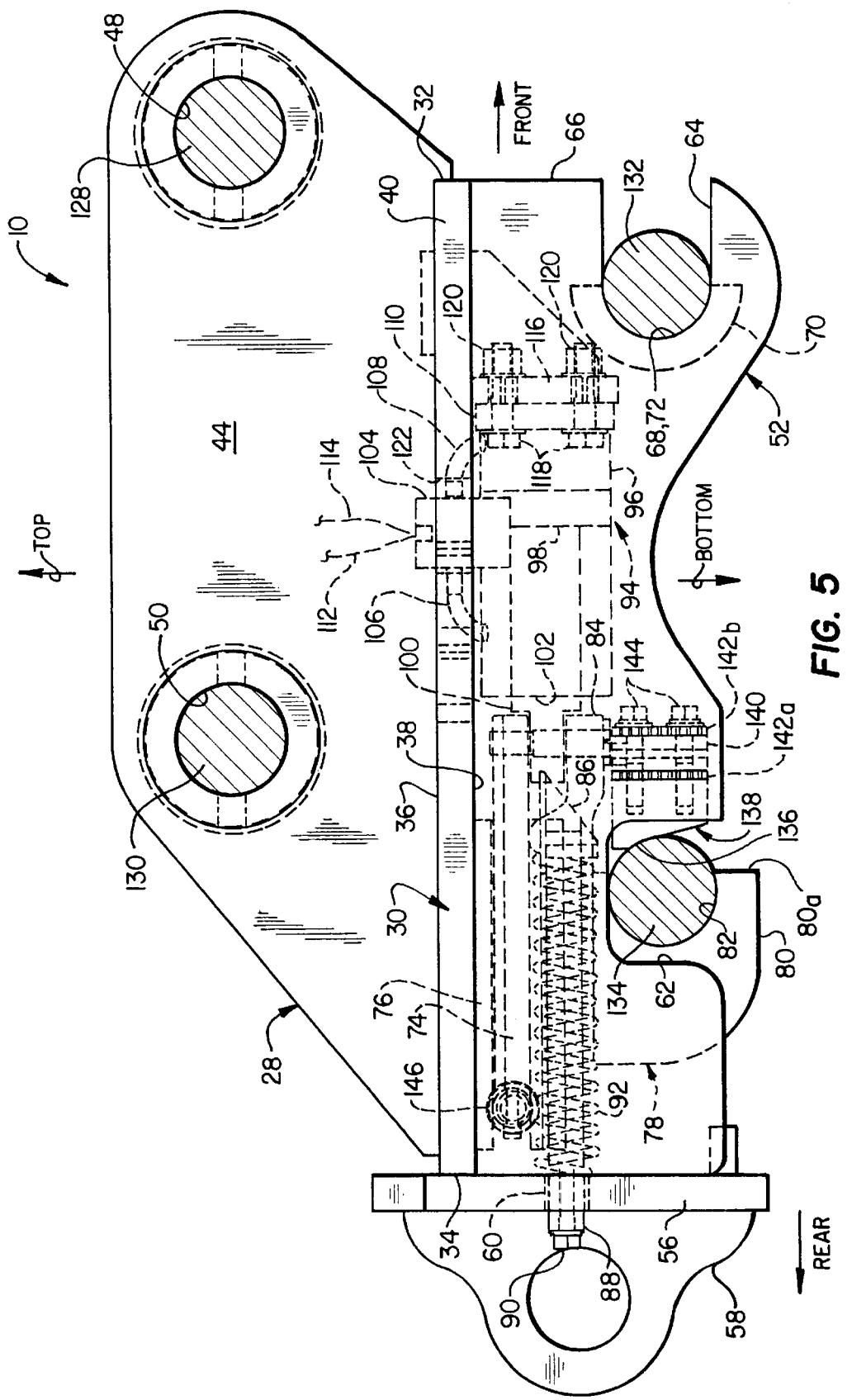

The tubular guide members 88 extend through a pair of elongated coiled compression springs 92 which bear at their opposite ends against the stop blocks 86 and the front or inner side of the rear end wall 56, with rear end portions of the tubular guide members extending outwardly through the rear end plate holes 60 (see FIG. 5). Springs 92 bias the support plate 74, and thus the latch hook member 78, forwardly away from the rear end plate 56. When the latch hook member 78 is forcibly moved toward the rear end plate 56, in a manner subsequently described herein, the springs 92 are compressed, and rear end portions of the tubular guide members 88 are extended further outwardly through the rear end plate holes 60 (compare FIGS. 4 and 5).

A hydraulic cylinder assembly 94 is used to forcibly drive the support plate 74, and thus the latch hook member 78, forwardly and rearwardly relative to the rear end plate 56. The hydraulic cylinder assembly 94 is of a conventional construction and includes a cylinder 96, a piston 98 slidably disposed within the cylinder 96, an actuating rod 100 anchored at its front end to the piston 98 and extending outwardly through a sealed opening in the rear end 102 of the cylinder 96, and a pilot-operated check valve 104 secured to the top side of the cylinder 96 and communicated with portions of the cylinder interior on opposite sides of the piston 98 by conduits 106,108. A rectangular mounting plate 110 is anchored to the front end of the cylinder 96. The valve 104 is operatively connected, on its top side, to a pair of pilot pressure hydraulic control lines 112,114.

The hydraulic cylinder assembly 94 is secured between the bottom side plates 52 and 54, forwardly of the latch hook member 78, by anchoring the cylinder assembly mounting plate 110 to a securement flange 116 depending from the base plate 30 using bolts 118 extended through aligned holes in the plate 110 and flange 116 and threaded into nuts 120.

Flange 116 is positioned forwardly of an opening 122 in the base plate 30 through which a portion of the valve 104 upwardly extends. The rear end of the actuating rod 100 extends under the attachment plate portion 84 of the latch hook member 78 and is anchored thereto using a bolt 124 extended downwardly through aligned holes 126 in the rear end of the actuating rod 100 and the plate portion 84 and threaded into an underlying opening in the support plate 74.

Via hydraulic pressure in a selected one of the lines 112 and 114, the slidably carried support plate 74 may be translationally driven forwardly and rearwardly relative to the balance of the quick coupler 10 to correspondingly translate the latch hook member 78 between a rearwardly shifted unlocking position shown in FIG. 4 and a forwardly shifted locking position shown in FIG. 5. With the latch hook member 78 in its FIG. 4 unlocking or retracted position, the front end 80a of the hook portion 80 is rearwardly adjacent the rear sides of the rear plate recesses 62, and the semicircular hook portion recess 82 is rearwardly shifted relative to the rear sides of the rear plate recesses 62. When the latch hook member 78 is translated forwardly to its FIG. 5 locking position, however, the front end 80a of the hook portion 80 is substantially shifted toward the front sides of the plate recesses 62, and the semicircular hook member recess 82 is shifted forwardly past the rear sides of the rear plate recesses 62.

Returning now to FIG. 1, the lower ends of the lift portion 14 and the curl portion 16 of the boom 18 are received between the top side plates 44,46 of the quick coupler 10, and the quick coupler 10 is secured to the boom portions 14,16 by (1) a stick pin 128 extended through and captively retained in the top side plate holes 48 and a corresponding hole in the boom lift portion 14, and (2) a curl pin 130 extended through and captively retained in the top side plate holes 50 and a corresponding hole in the boom curl portion 16. Corresponding stick and curl pins 132,134 extend through and are captively retained in the circular holes 24,26 of the top bucket side plates 22. In a manner which will now be described, the quick coupler 10 is utilized to rapidly connect and disconnect the bucket 12 to the boom 18 without the necessity of removing and reinstalling any of the pins 128,130,132 and 134.

With reference now to FIGS. 4 and 5, with the latch hook member 78 hydraulically translated rearwardly to its FIG. 4 unlocking position, the quick coupler 10 is rotated in a clockwise direction from its FIG. 4 position and then moved downwardly in a manner such that the attachment stick pin 132 upwardly enters the front end recesses 64 of the bottom quick coupler side plates 52,54. The quick coupler 10 is then rotated in a counterclockwise direction to cause the attachment curl pin 134 to upwardly enter the rear recesses 62 of the bottom quick coupler side plates 52,54 as shown in FIG. 4.

Next, as shown in FIG. 5, the hydraulic cylinder assembly 94 is used to translationally drive the latch hook member forwardly to its indicated FIG. 5 locking position in which the semicircular latch hook recess 82 complementarily engages a corresponding semicircular rear side circumferential portion of the pin 134, and a bottom section of the latch hook portion 80 underlies the pin 134 and captively retains the bucket curl pin 134 in the rear bottom plate recesses 62, thereby also captively retaining the bucket stick pin 132 in the front bottom plate recesses 64 and releasably preventing removal of the bucket from the quick coupler 10.

Figure 2:
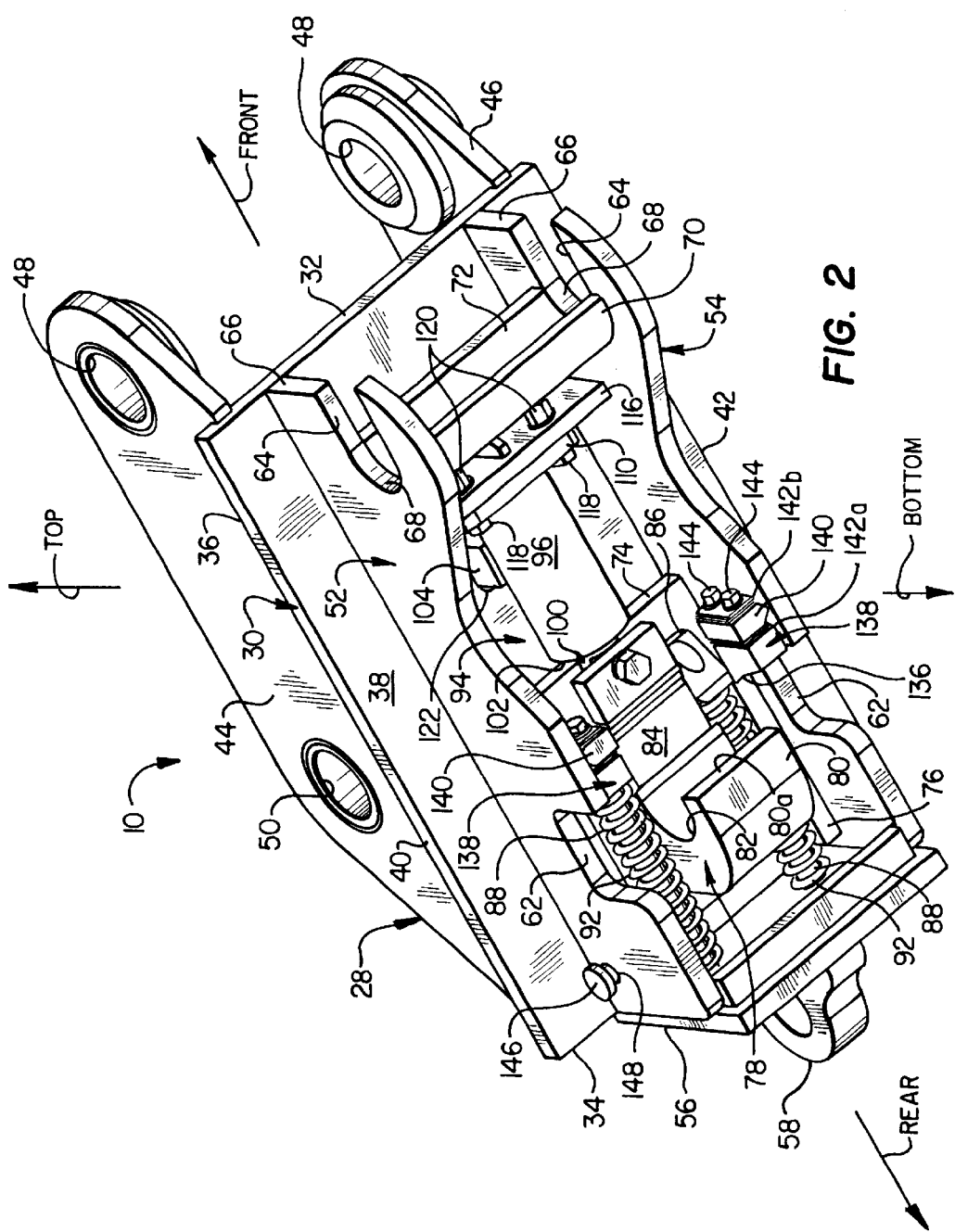
FIG. 2 is an enlarged scale bottom side perspective view of the quick coupler device removed from the boom structure and excavating bucket.
Figure 3:
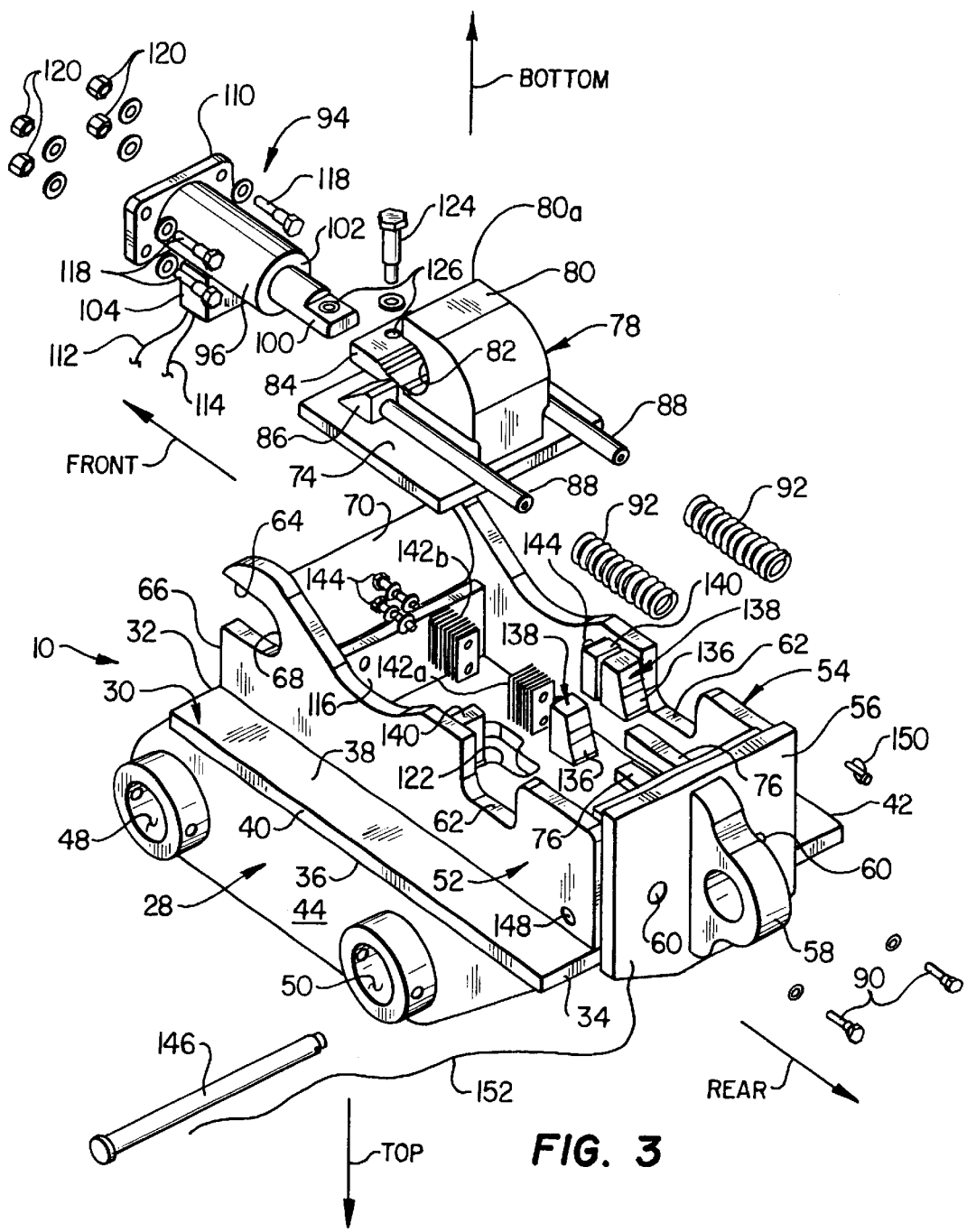
FIG. 3 is a partially exploded bottom side perspective view of the quick coupler device.

With reference now to FIGS. 2, 3 and 5, with the latch hook member 78 forwardly translated to its FIG. 5 locking position, a front side portion of the captively retained bucket curl pin 134 is in contact with arcuate rear side surface portions 136 of a pair of translationally adjustable stop block members 138 which, in a manner later described herein, may be forwardly and rearwardly shifted relative to the balance of the quick coupler 10 to compensate for wear at the coupler/bucket pin interface areas and/or an increase or decrease in the spacing between the pins carried by the particular implement to be releasably connected to the boom 18 by the quick coupler 10.

Stop block members 138 are releasably secured on the rear sides of a pair of rectangular support bosses 140 welded to the inner sides of the bottom coupler side plates 52,54 forward of the rear plate recesses 62. Rectangular metal adjustment shims 142a are interposed between the support bosses 140 and their associated stop block members 138, and rectangular metal adjustment shims 142b are positioned on the front sides of the support bosses 140. Each stop block member 138 and its adjustment shims 142a,142b are removably attached to their associated support boss 140 by bolts 144 that extend rearwardly through aligned holes extending through the support boss 140 and its associated shims 142a,142b and are threaded into openings formed in the stop block member 138.

By simply increasing or decreasing the number of shims between each stop block member 138 and its associated support boss 140, each stop block member 138 may be shifted rearwardly or forwardly relative to the latch hook member 78 to easily adjust for changes in implement pinto-spin spacing and/or wear at the coupler/implement pin interface area. The ability to bring the stop block members 138 into contact with the implement curl pin 134 received in the coupler plate recesses 62, together with the firm circumferential contact between the latch hook member 78 and the curl pin 134, and the firm circumferential contact between the front recess surfaces 68,72 and the stick pin 132 substantially reduces undesirable play and chatter between the quick coupler 10 and the implement pins 132,134.

In addition to providing for an improved adjustable connection of an implement such as the illustrated excavation bucket 12 to the boom 18, the quick coupler 10 has incorporated therein a unique set of redundant locking structure safety features designed to substantially lessen the possibility that the bucket 12 will become unintentionally detached from the quick coupler 10 after the implement pins 132,134 are captively retained on the coupler 10 as indicated in FIG. 5.

First, in response to loss of hydraulic pressure supplied thereto the conventional pilot pressure-operated valve 104 functions as a check valve in a manner preventing hydraulic fluid flow from the interior portion of the cylinder 96 rearwardly of the piston 98 outwardly through the conduit 106. Thus, with the latch hook member 78 in its FIG. 5 locking position, the hydraulic cylinder assembly 94 automatically functions to hydraulically lock the latch hook member 78 in its FIG. 5 locked position, thereby preventing removal of the pins 132,134 from the coupler 10, in the event of loss of hydraulic pressure to the valve 104.

Second, the compression springs 92 automatically function to bias the latch hook member 78 toward, and hold it in, its FIG. 5 locking position. Thus, a substantial force is required to rearwardly translate the latch hook member 78 to its FIG. 4 unlocking position to permit withdrawal of the implement curl pin 134 from the coupler recesses 62.

Third, a mechanical locking structure is provided to physically block the rearward translational movement of the latch hook member 78 from its FIG. 5 locking position to its FIG. 4 unlocked position. Specifically, with the latch hook member 78 in its FIG. 5 locking position, an elongated cylindrical locking pin 146 is inserted through aligned circular holes 148 formed through upper rear corner portions of the bottom coupler side plates 52 and 54. A longitudinally intermediate portion of the inserted pin 146 is positioned immediately rearwardly of the rear end of the support plate 74 to which the latch hook member 78 is anchored. Accordingly, the inserted pin 146 physically blocks rearward movement of the support plate 74 and thus mechanically prevents rearward translational unlocking movement of the latch hook member 78 from its FIG. 5 locking position. The pin 146 is captively retained within the plate holes 148 by a linch pin 150 (see FIG. 3) operatively secured to an outwardly projecting end portion of the inserted pin 146. Pin 146 may be conveniently retained on the coupler body 28 by, for example, a schematically depicted chain or cable 152 (see FIG. 3) interconnected between the pin 146 and the coupler body 28.

In addition to these redundant safety features incorporated into the quick coupler 10, the coupler 10 also provides a visual safety feature that reliably indicates to an operator that the latch hook member 78 is in its unlocking orientation. Specifically, as can be readily be seen by comparing FIGS. 4 and 5, when the latch hook member 78 is in its FIG. 4 unlocking position, substantial rear end portions of the spring guide members 88 project rearwardly beyond the rear end plate member 56 to visually alert the operator that the latch hook member 78 is in its unlocked position. These outer guide member end portions may be painted with a highly visible color, such as red, to further visually highlight the unlocked orientation of the latch hook member.

Another desirable feature of the quick coupler 10 is the provision thereon of the lifting eye 58. This permits the quick coupler 10 to be used in lifting a heavy object (by suitably attaching the object to the lifting eye 58) in addition to, or in place of, a particular implement attached to the coupler. An additional benefit of the quick coupler 10 is that the hydraulic cylinder assembly 94 is designed to operate on pilot hydraulic pressure (normally on the order of about 500 psi) as opposed to being operated by main hydraulic pressure (normally on the order of about 5000 psi). This advantageously permits the latch member 78 to be forwardly and rearwardly translated without disturbing other prime mover operations requiring main hydraulic system pressure.

Quick coupler 10 provides a variety of advantages over quick couplers of conventional construction. For example, its unique combination of the translational latch hook member and the translationally adjustable stop block members that face the latch hook member renders the quick coupler easily adjustable to compensate for interface wear and changes in implement pin-to-pin spacing while at the same time substantially reducing undesirable play and chatter between the coupler and its attached implement. Moreover, in all of its adjusted positions the coupler engages the two implement pins through circumferential arcs—representatively at least 180 degrees on each pin. This desirably spreads the coupler loads on the implement pins to appreciably reduce contact wear thereon.

A variety of modifications could be made to the quick coupler 10 without departing from principles of the present invention. For example, the hydraulic cylinder assembly 94 could be operated with high hydraulic pressure instead of with pilot hydraulic pressure, and implements other than the illustrated excavation bucket 12 could be utilized in conjunction with the coupler 10. Moreover, a mechanical structure (such as a lead screw structure or the like) could be used in place of the hydraulic cylinder assembly 94 to forcibly translate the latch hook member 78 forwardly and rearwardly if desired.

Also, the hook moving structure could be positioned rearwardly of the hook structure, instead of forwardly thereof, if desired. Similarly, means other than shims could be used to forwardly and rearwardly adjust the stop blocks 138 if desired. Further, although the quick coupler 10 has been illustrated and described as having the latch hook member 78 engage the implement curl pin 134, it will be appreciated by those of skill in this particular art that the latch hook member 78 and adjustable stop block members 138 could instead be operatively associated with the implement stick pin 132 if desired. Additionally, the plate recesses 62 and 64, the latch hook member 78 and/or the stop block members 138 could have configurations different than those representatively illustrated herein.

The foregoing detailed description is to be clearly understood as being given by way of illustration and example, the spirit and scope of the present invention being limited solely by the appended claims.

What is claimed is:

1. Quick coupler apparatus for releasably attaching a work implement having spaced apart parallel first and second attachment pins to a boom of a prime mover, comprising:

a body portion releasably securable to the boom and having spaced apart first and second recess areas operative to respectively and releasably receive the first and second work implement attachment pins;

a latch member carried by said body portion for movement relative thereto between (1) a locking position in which said latch member engages a first side portion of the first attachment pin in a manner captively retaining the first and second attachment pins respectively in said first and second recess areas, and (2) an unlocking position in which said latch member is disengaged from the first attachment pin and permits removal of the first and second attachment pins respectively from said first and second recess areas;

a drive structure operative to selectively drive said latch member between said locking and unlocking positions;

a locking structure operative to releasably hold said latch member in said locking position; said locking structure comprising a spring structure resiliently biasing said latch member toward said locking position and a stop structure operative to engage the first attachment pin on a second side portion thereof and being adjustable toward and away from said latch member, said locking structure further including an opposed pair of openings formed in said body portion, and a blocking member extendable through said openings, when said latch member is in said locking position, and being operable to mechanically block movement of said latch member from said locking position to said unlocking position.

2. Quick coupler apparatus for releasably attaching a work implement having spaced apart parallel first and second attachment pins to a boom of a prime mover, comprising:

a body portion releasably securable to the boom and having spaced apart first and second recess areas operative to respectively and releasably receive the first and second work implement attachment pins;

a latch member carried by said body portion for movement relative thereto between (1) a locking position in which said latch member engages a first side portion of the first attachment pin in a manner captively retaining the first and second attachment pins respectively in said first and second recess areas, and (2) an unlocking position in which said latch member is disengaged from the first attachment pin and permits removal of the first and second attachment pins respectively from said first and second recess areas;

a drive structure operative to selectively drive said latch member between said locking and unlocking positions;

a locking structure operative to releasably hold said latch member in said locking position; said locking structure comprising a spring structure resiliently biasing said latch member toward said locking position and a stop structure operative to engage the first attachment pin on a second side portion thereof and being adjustable toward and away from said latch member, said stop structure comprising a stop member operative to engage the first attachment pin on the second side portion thereof and being carried by said body portion for translational movement toward and away from said latch member, said stop member being secured to said body portion for translational movement toward and away from a surface thereof, and said stop structure further comprising a selectively variable number of shim members releasably supported between said stop member and said surface of said body portion.

3. Quick coupler apparatus for releasably attaching a work implement, such as an excavation bucket, having spaced apart parallel first and second attachment pins to a boom of a prime mover such as an excavator, said quick coupler apparatus comprising:

a body portion releasably securable to the boom and having spaced apart, parallel and facing plate portions with first and second spaced apart first and second edge recess areas formed therein and operative to respectively and releasably receive the first and second work implement attachment pins;

a generally hook-shaped latch member carried by said body portion for translational movement relative thereto between (1) a locking position in which said latch member engages a first side portion of the first attachment pin, and partially circumscribes the first attachment pin, in a manner captively retaining the first and second attachment pins respectively in said first and second edge recess areas, and (2) an unlocking position in which said latch member is disengaged from the first side surface portion of the first attachment pin and permits removal of the first and second attachment pins respectively from said first and second edge recess areas;

a drive structure operative to selectively translate said latch member between said locking and unlocking positions;

a locking structure operative to releasably hold said latch member in said locking position; and a stop structure secured to said body portion, operative to engage the first attachment pin on a second side portion thereof generally opposite from the first side portion thereof, while the first side portion of said first attachment pin is engaged by said latch member, and being translationally adjustable toward and away from said latch member.

4. The quick coupler apparatus of claim 3 wherein:

said latch member is configured to complementarily engage the first side portion of the received first attachment pin around a circumferential arc of approximately 180 degrees when said latch member is in said locking position.

5. The quick coupler apparatus of claim 3 wherein said stop structure is configured to complementarily engage the second side portion of the received first attachment pin along a circumferential portion thereof.

6. The quick coupler apparatus of claim 3 further comprising:

a lifting eye secured to and projecting outwardly from said body portion.

7. Quick coupler apparatus for releasably attaching a work implement, such as an excavation bucket, having spaced apart parallel first and second attachment pins to a boom of a prime mover such as an excavator, said quick coupler apparatus comprising:

a body portion releasably securable to the boom and having spaced apart, parallel and facing plate portions with first and second spaced apart first and second edge recess areas formed therein and operative to respectively and releasably receive the first and second work implement attachment pins;

a generally hook-shaped latch member carried by said body portion for translational movement relative thereto between (1) a locking position in which said latch member engages a first side portion of the first attachment pin, and partially circumscribes the first attachment pin, in a manner captively retaining the first and second attachment pins respectively in said first and second edge recess areas, and (2) an unlocking position in which said latch member is disengaged from the first side surface portion of the first attachment pin and permits removal of the first and second attachment pins respectively from said first and second edge recess areas;

a drive structure operative to selectively translate said latch member between said locking and unlocking positions, said drive structure being a hydraulic cylinder assembly with an actuating rod portion drivingly coupled to said latch member;

a locking structure operative to releasably hold said latch member in said locking position; and a stop structure operative to engage the first attachment pin on a second side portion thereof generally opposite from the first side portion thereof and being translationally adjustable toward and away from said latch member.

8. The quick coupler apparatus of claim 7 wherein said locking structure comprises:

a spring structure resiliently biasing said latch member toward said locking position;

a mechanical blocking member connectable to said body portion in a manner mechanically blocking translational movement of said latch member away from said locking position, and a portion of said hydraulic cylinder assembly operative to hydraulically lock said latch member in said locking position in response to loss of hydraulic pressure to said hydraulic cylinder assembly when said latching member is in said locking position.

9. Quick coupler apparatus for releasably attaching a work implement, such as an excavation bucket, having spaced apart parallel first and second attachment pins to a boom of a prime mover such as an excavator, said quick coupler apparatus comprising:

a body portion releasably securable to the boom and having spaced apart, parallel and facing plate portions with first and second spaced apart first and second edge recess areas formed therein and operative to respectively and releasably receive the first and second work implement attachment pins;

a generally hook-shaped latch member carried by said body portion for translational movement relative thereto between (1) a locking position in which said latch member engages a first side portion of the first attachment pin, and partially circumscribes the first attachment pin, in a manner captives retaining the first and second attachment pins respectively in said first and second edge recess areas, and (2) an unlocking position in which said latch member is disengaged from the first side surface portion of the first attachment pin and permits removal of the first and second attachment pins respectively from said first and second edge recess areas;

a drive structure operative to selectively translate said latch member between said locking and unlocking positions;

a locking structure operative to releasably hold said latch member in said locking position; and a stop structure operative to engage the first attachment pin on a second side portion thereof generally opposite from the first side portion thereof and being translationally adjustable toward and away from said latch member, said locking structure comprising a spring structure resiliently biasing said latch member toward said locking position, and a mechanical blocking member connectable to said body portion in a manner mechanically blocking translational movement of said latch member away from said locking position.

10. The quick coupler apparatus of claim 9 further comprising:

an elongated spring guide member circumscribed by said spring structure, said spring guide member being longitudinally movable outwardly through said exterior wall opening, in response to movement of said latch member to said unlocking position, to provide a visual indication that said latch member is in said unlocking position.

11. Quick coupler apparatus for releasably attaching a work implement, such as an excavation bucket, having spaced apart parallel first and second attachment pins to a boom of a prime mover such as an excavator, said quick coupler apparatus comprising:

a body portion releasably securable to the boom and having spaced apart, parallel and facing plate portions with first and second spaced apart first and second edge recess areas formed therein and operative to respectively and releasably receive the first and second work implement attachment pins;

a generally hook-shaped latch member carried by said body portion for translational movement relative thereto between (1) a locking position in which said latch member engages a first side portion of the first attachment pin, and partially circumscribes the first attachment pin, in a manner captively retaining the first and second attachment pins respectively in said first and second edge recess areas, and (2) an unlocking position in which said latch member is disengaged from the first side surface portion of the first attachment pin and permits removal of the first and second attachment pins respectively from said first and second edge recess areas;

a drive structure operative to selectively translate said latch member between said locking and unlocking positions;

a locking structure operative to releasably hold said latch member in said locking position; and a stop structure operative to engage the first attachment pin on a second side portion thereof generally opposite from the first side portion thereof and being translationally adjustable toward and away from said latch member, said stop structure comprising a stop member secured to said body portion for translational movement toward and away from a surface thereof, and said stop structure further including a selectively variable number of shim members releasably supported between said stop member and said surface of said body portion.

12. Quick coupler apparatus for releasably attaching a work implement, such as an excavation bucket, having spaced apart parallel first and second attachment pins to a boom of a prime mover such as an excavator, said quick coupler apparatus comprising:

a body portion releasably securable to the boom and having spaced apart parallel and facing plate portions with first and second spaced apart first and second edge recess areas formed therein and operative to respectively and releasably receive the first and second work implement attachment pins;

a generally hook-shaped latch member carried by said body portion for translational movement relative thereto between (1) a locking position in which said latch member engages a first side portion of the first attachment pin, and partially circumscribes the first attachment pin, in a manner captively retaining the first and second attachment pins respectively in said first and second edge recess areas, and (2) an unlocking position in which said latch member is disengaged from the first side surface portion of the first attachment pin and permits removal of the first and second attachment pins respectively from said first and second edge recess areas;

a drive structure operative to selectively translate said latch member between said locking and unlocking positions;

a locking structure operative to releasably hold said latch member in said locking position; and a stop structure operative to engage the first attachment pin on a second side portion thereof generally opposite from the first portion thereof, said stop structure comprising a stop member secured to said body portion for translational movement toward and away from a surface thereof, and a selectively variable number of shim members releasably supported between said stop member and said surface of said body portion.

* * * * *